United States Patent [19]
Harrop

[11] 4,156,703
[45] May 29, 1979

[54] PROCESS FOR IMPROVING THE PROCESSABILITY OF POLYOLEFINS AND IMPROVED POLYOLEFIN COMPOSITIONS

[75] Inventor: William H. Harrop, Downingtown, Pa.

[73] Assignee: Rohm and Haas Company, Philadelphia, Pa.

[21] Appl. No.: 641,316

[22] Filed: Dec. 16, 1975

Related U.S. Application Data

[63] Continuation-in-part of Ser. No. 484,840, Jul. 1, 1974, abandoned.

[51] Int. Cl.² ............................................. C08L 23/06
[52] U.S. Cl. ............................ 260/876 R; 260/897 B; 521/134
[58] Field of Search ................... 260/897 B, 876 R

[56] References Cited

U.S. PATENT DOCUMENTS

| | | | |
|---|---|---|---|
| 2,353,457 | 7/1944 | Goessling | 260/901 |
| 3,228,790 | 1/1966 | Sexsmith et al. | 117/138.8 |
| 3,299,181 | 1/1967 | Coover et al. | 260/897 |
| 3,562,235 | 2/1971 | Ryan | 260/885 |

FOREIGN PATENT DOCUMENTS

| | | | |
|---|---|---|---|
| 46-40773 | 12/1971 | Japan | 260/901 |
| 930074 | 7/1963 | United Kingdom. | |
| 935603 | 8/1963 | United Kingdom | 260/897 B |

*Primary Examiner*—Carman J. Seccuro
*Attorney, Agent, or Firm*—Michael B. Fein

[57] ABSTRACT

A composition comprising polyethylene and a minor amount of an acrylic polymer, and a process for improving processability of polyethylene comprising blending therewith an acrylic polymer is disclosed.

8 Claims, No Drawings

PROCESS FOR IMPROVING THE PROCESSABILITY OF POLYOLEFINS AND IMPROVED POLYOLEFIN COMPOSITIONS

CROSS REFERENCE TO RELATED APPLICATIONS

This application is a continuation-in-part of U.S. Ser. No. 484,840 filed July 1, 1974, now abandoned and is related to co-pending application Ser. No. 587,482 of June 16, 1975, now abandoned.

BACKGROUND OF THE INVENTION

This invention relates to polyethylene and to processes for improving polyethylene.

Acrylic polymers are well known as being useful as modifiers for polyvinyl chloride (PVC), for example as processing aids. To those familiar with this art, it is well known that a PVC processing aid and the PVC must be mutually soluble so that blends of the two substances will be clear even though the refractive indices of the two substances are different. Thus if one skilled in the polymer art chose to try to improve the processability of other polymers, for example polypropylene, he would seek a substance which was compatible and eliminate from consideration any modifiers which were incompatible. Thus acrylic polymers, which when blended with polyethylene are incompatible, would be eliminated immediately from consideration as process aids.

Although the prior art (Coover et al., U.S. Pat. No. 3,156,743) does teach that fibers spun from polypropylene and minor amounts of acrylic polymers have improved oxidative degradation resistance, weatherability, and stability to ultraviolet light; i.e., the acrylic polymer is taught to be a stabilizer for polypropylene fiber. However, Coover et al. teach away from use of acrylic polymers in polyethylene because of incompatibility, which made fibers produced from such blends unacceptable and unuseful. Joyner et al., U.S. Pat. No. 3,240,552, teach improving the dyeability of polypropylene fibers by incorporation of acrylic polymer combined with a chelating agent. Sexsmith et al., U.S. Pat. No. 3,228,790, teach aqueous dispersions of colloidal polyolefin and acrylic resins.

None of these references, nor any other prior art, of which I am aware, teach improving the processability of polyethylene by melt blending therewith an acrylic polymer.

It is an object of the present invention to provide a novel polyethylene composition having improved processability.

These and other objects as will become apparent from the description which follows, are achieved by the present invention which comprises a method for improving the processability of polyethylene comprising blending therewith an acrylic polymer and a chelating agent free composition comprising a polyethylene and an acrylic polymer.

DETAILED DESCRIPTION AND PREFERRED EMBODIMENTS

The polyethylene can be high or low density, and can be of high, medium, or low molecular weight. Molecular weights ($\overline{M}_v$) above 600,000 are preferred.

While any acrylic polymer is thought to be useful, those having a molecular weight ($\overline{M}_v$) of over 100,000 are preferred. It is preferable that the monomer system, polymerized by known methods to the acrylic polymer, comprises at least 50 percent by weight and, more preferably, 100 percent of at least one ester of acrylic acid or methacrylic acid. Preferably the esters are $C_1$ to $C_{25}$. Mixtures of esters are preferred. Methyl methacrylate, isobornyl methacrylate, methyl acrylate, ethyl acrylate, and butyl acrylate are the preferred monomers. The monomer system contains at least 50% by weight methyl methacrylate.

The acrylic polymer is either a single stage or multistage polymer, and so can be of one, two, or more stages. Sequential polymerization to produce "core-shell" or "graft" polymers is well known.

The acrylic polymer is useful to improve processability of polyethylene at levels as low as 1% by weight. While there is no upper limit on the level of acrylic polymer which increases processability, amounts above 25% are not economically advantageous. Below 1% usually gives too little improvement in processing to be useful.

The blend of the acrylic polymer and the polyethylene is a heterogeneous mixture, i.e., the two substances are incompatible, as indicated by the opaque or translucent characteristics of the blend.

The compositions of the invention are suitable for injection molding, film, foam, and profile extrusion, blow molding and foams. Foams can be made by incorporation of a blowing agent and other well known additives such as particulate nucleating agent, and thereafter extruding or injection molding. The preferred blowing agents are the fluorocarbons. The addition of the acrylic polymer unexpectedly improves the hot strength and elongation of the polyethylene.

The following examples are presented to illustrate a few specific embodiments of the invention. The invention is not intended to be limited thereby. Parts are by weight unless indicated otherwise.

EXAMPLE 1

This example illustrates the preparation of a number of acrylic polymers.

A copolymer of ethyl acrylate (EA) with methyl methacrylate (MMA), at a ratio of 35/65 and a molecular weight, $\overline{M}_v$, of $5-7 \times 10^5$ was prepared by standard emulsion polymerization and spray-dried.

EXAMPLE 2

An ultra high molecular weight grade of high-density polyethylene ($\overline{M}_v$ of 2–3 million) was fed to a two roll mill at a roll temperature of 310° F. It was impossible to process this material, and the processability was rated as "very poor."

The same polyethylene (100 parts) was dry blended with 10 parts of the acrylic polymer of Example 1 and fed to the two roll mill at the same temperature. The processability was rated as "very good." The material produced is translucent because the melt blend is a heterogeneous mixture due to incompatibility of the acrylic polymer and the polyethylene. No chelating agent is present.

I claim:

1. A chelating agent-free composition comprising a melt blend of polyethylene having a molecular weigh $\overline{M}_v$ of above 600,000 and about 1 to 25% of an acrylic polymer polymerized from a monomer system comprising at least 50% by weight methyl methacrylate and the remainder another acrylate.

2. The composition of claim 1, wherein said polyethylene is high density polyethylene.

3. The composition of claim 1, wherein said acrylic polymer has a molecular weight ($\overline{M}_v$) of at least 100,000.

4. The composition of claim 1, wherein said acrylic polymer is a multistage polymer.

5. The composition of claim 1, wherein said acrylic polymer is a single stage polymer.

6. The composition of claim 1, wherein said acrylate is ethyl acrylate.

7. A process comprising melt blending polyethylene having a molecular weight $\overline{M}_v$ of above 600,000 with about 1 to 25% of an acrylic polymer polymerized from a monomer system comprising at least 50% by weight methyl methacrylate with the remainder another acrylate, and injection molding, extruding, foaming, or blow molding the blend so as to form articles.

8. Articles formed by the process of claim 7.

* * * * *